(12) United States Patent
Miller et al.

(10) Patent No.: US 9,669,815 B2
(45) Date of Patent: Jun. 6, 2017

(54) DUAL ASPIRATOR SYSTEM WITH ASPIRATOR SHUT-OFF VALVE

(71) Applicants: James H. Miller, Ortonville, MI (US); Keith Hampton, Ann Arbor, MI (US); David E. Fletcher, Flint, MI (US)

(72) Inventors: James H. Miller, Ortonville, MI (US); Keith Hampton, Ann Arbor, MI (US); David E. Fletcher, Flint, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 7 days.

(21) Appl. No.: 14/463,200

(22) Filed: Aug. 19, 2014

(65) Prior Publication Data

US 2016/0053727 A1    Feb. 25, 2016

(51) Int. Cl.
  *F02M 35/10*    (2006.01)
  *B60T 13/46*    (2006.01)
  *B60T 17/02*    (2006.01)

(52) U.S. Cl.
  CPC .............. *B60T 13/46* (2013.01); *B60T 17/02* (2013.01); *F02M 35/10157* (2013.01); *F02M 35/10229* (2013.01)

(58) Field of Classification Search
  CPC ....... F02M 35/10229; F02M 35/10118; F02M 23/08; B01F 5/0413; B01F 5/0421; B01F 5/043
  USPC ... 123/184.21, 184.56, 65 WV, 339.28, 389; 137/565.22, 565.23, 115.11, 502, 888, 137/891; 417/187, 188, 189
  See application file for complete search history.

(56) References Cited

U.S. PATENT DOCUMENTS

| | | |
|---|---|---|
| 1,845,969 A | 2/1932 | Hueber |
| 2,905,268 A | 9/1959 | McMichael |
| 3,234,932 A | 2/1966 | Bird et al. |
| 3,505,983 A | 4/1970 | Härtel |
| 3,635,601 A * | 1/1972 | Larson .................. D06F 39/022 137/100 |
| 3,698,510 A | 10/1972 | Blatt et al. |
| 3,754,841 A | 8/1973 | Grabb et al. |
| 4,211,200 A | 7/1980 | Rocchio et al. |

(Continued)

FOREIGN PATENT DOCUMENTS

| | | |
|---|---|---|
| DE | 4310761 | 10/1994 |
| DE | 102012015290 | 2/2014 |

(Continued)

OTHER PUBLICATIONS

PCT, International Search Report and Written Opinion, PCT/US2014/041250 (Oct. 27, 2014).

(Continued)

*Primary Examiner* — Long T Tran
(74) *Attorney, Agent, or Firm* — Thompson Hine LLP

(57) ABSTRACT

An engine system including a first flowpath between a first component and a second component where a first aspirator forms a portion of the first flowpath, and a second flowpath between the first component and the second component, where a second aspirator forms a portion of the second flowpath. A shut-off valve forms a portion of the second flowpath. The first aspirator and the second aspirator each have a suction inlet, and the suction inlet of the first aspirator is in fluid communication with the suction inlet of the second aspirator.

19 Claims, 3 Drawing Sheets

(56) References Cited

U.S. PATENT DOCUMENTS

| | | | |
|---|---|---|---|
| 4,499,034 A | 2/1985 | McAllister | |
| 4,519,423 A | 5/1985 | Ho et al. | |
| 4,554,786 A | 11/1985 | Takeuchi et al. | |
| 4,610,428 A | 9/1986 | Fox | |
| 4,922,965 A | 5/1990 | Meister | |
| 5,108,266 A | 4/1992 | Hewitt | |
| 5,188,141 A | 2/1993 | Cook et al. | |
| 5,291,916 A | 3/1994 | Kloosterman et al. | |
| 5,799,831 A * | 9/1998 | Spriggs | B01F 5/0406 137/889 |
| 5,816,446 A | 10/1998 | Steindorf et al. | |
| 6,035,881 A | 3/2000 | Emmerich et al. | |
| RE37,090 E | 3/2001 | Kloosterman et al. | |
| 6,220,271 B1 | 4/2001 | Emmerich et al. | |
| 6,685,462 B2 * | 2/2004 | Jones | F23C 6/047 431/115 |
| 7,722,132 B2 | 5/2010 | Carlsson | |
| 2006/0016477 A1 | 1/2006 | Zaparackas | |
| 2011/0132311 A1 | 6/2011 | Pursifull et al. | |
| 2011/0186151 A1 | 8/2011 | Sparazynski | |
| 2011/0214646 A1 * | 9/2011 | Makino | B01D 50/00 123/518 |
| 2012/0285421 A1 | 11/2012 | Cunningham et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2013/0340732 A1 * | 12/2013 | Pursifull | F02M 35/10222 123/572 |
| 2015/0020524 A1 | 1/2015 | Fletcher et al. | |
| 2015/0114350 A1 | 4/2015 | Pursifull | |

FOREIGN PATENT DOCUMENTS

| | | |
|---|---|---|
| GB | 2129516 | 5/1984 |
| JP | 20020318649 | 7/2003 |

OTHER PUBLICATIONS

US, Final Office Action; U.S. Appl. No. 14/294,727; (Apr. 22, 2016).

US, Non-Final Office Action; U.S. Appl. No. 14/565,075; (Jul. 21, 2016).

PCT, International Search Report and Written Opinion, Patent Application No. PCT/US2015/045264 (Feb. 4, 2016).

* cited by examiner

DUAL ASPIRATOR SYSTEM WITH ASPIRATOR SHUT-OFF VALVE

TECHNICAL FIELD

This application relates to multi-aspirator systems, more particularly to dual aspirator systems incorporating aspirator shut-off valves.

BACKGROUND

Internal combustion engines, its mechanisms, refinements and iterations are used in a variety of moving and non-moving vehicles or housings. Today, for example, internal combustion engines are found in terrestrial passenger and industrial vehicles, marine, stationary, and aerospace applications.

Engines, for example vehicle engines, are being downsized and boosted, which is reducing the available vacuum from the engine. This vacuum has many potential uses, including use by the vehicle brake booster to reduce the brake actuation force required from the operator.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is an aspirator that generates vacuum by creating an engine air flow path that is parallel to the throttle, referred to as an intake leak. This leak flow passes through a Venturi that generates a suction vacuum. To limit the bypass of the engine throttle, it has been known to place a flow control device in the motive flow path. One way to regulate the amount of flow is to utilize a sophisticated variable flow rate control device, which requires some means to control the flow resistance. This solution is complicated and expensive.

There is a need to continue to improve the efficiency, power, and control within engine systems utilizing simpler and less expensive techniques, including the generation of vacuum for various applications such as brake boost.

SUMMARY

In one aspect, an engine system is disclosed. The engine system includes a first flowpath between a first component and a second component where a first aspirator forms a portion of the first flowpath, and a second flowpath between the first component and the second component, where a second aspirator forms a portion of the second flowpath. A shut-off valve forms a portion of the second flowpath. The first aspirator and the second aspirator each have a suction inlet, and the suction inlet of the first aspirator is in fluid communication with the suction inlet of the second aspirator.

In another aspect, a system for generating vacuum is disclosed. The system includes a first aspirator defining a conduit having a Venturi gap separating the conduit into a converging section and a diverging section and a second aspirator defining a conduit having a Venturi gap separating the conduit into a converging section and a diverging section. The system further includes a suction housing having a suction port and conjoiningly mating the Venturi gap of the first aspirator with the Venturi gap of the second aspirator for fluid communication with the suction port. A shut-off valve is positioned in a flowpath of the second aspirator to shut off the flow therethrough without shutting off a flow through the first aspirator. The suction port connects both the first aspirator and the second aspirator to the same device requiring a vacuum or a vacuum reservoir.

DETAILED DESCRIPTION

Figure 1:
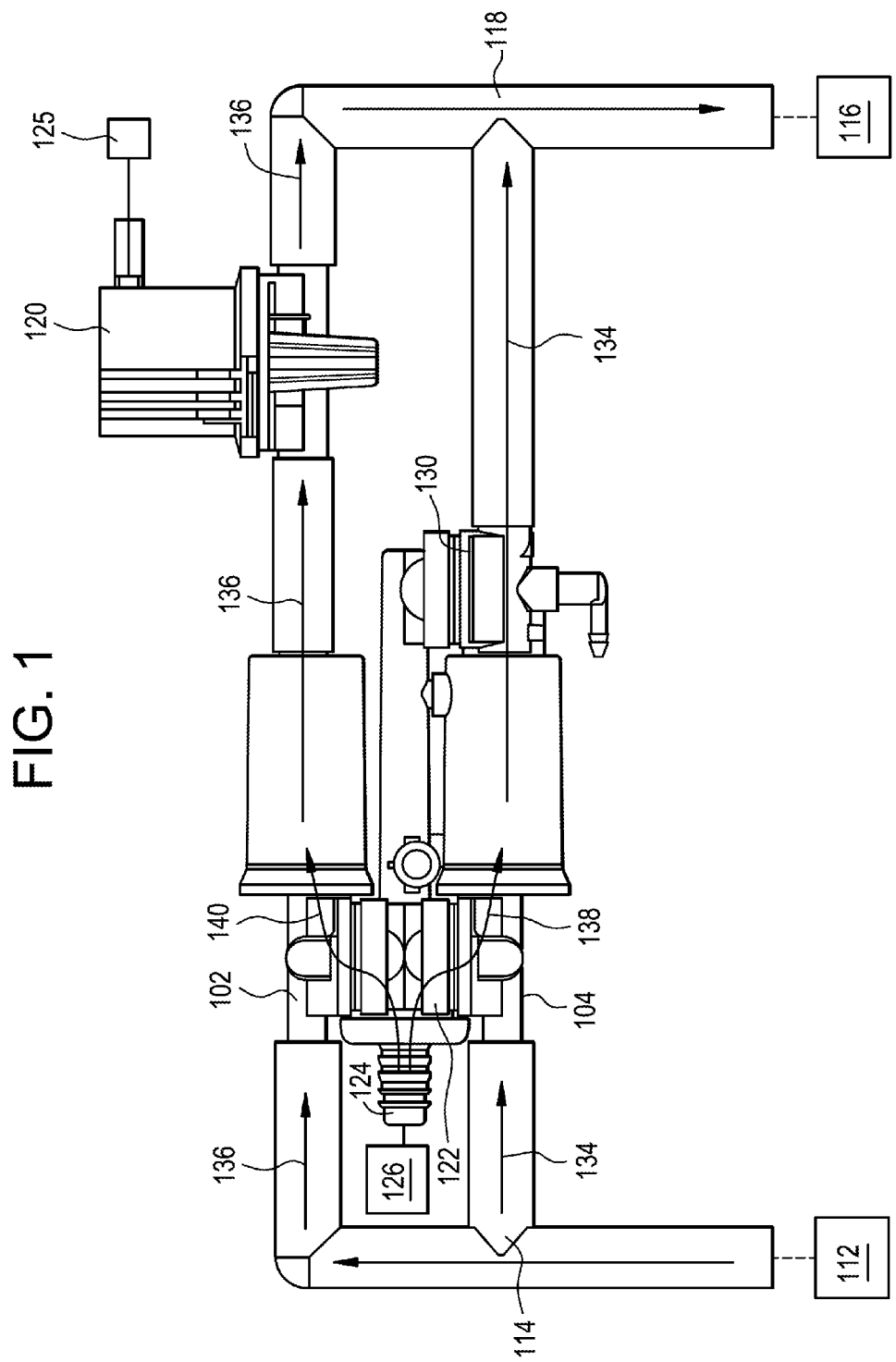
FIG. 1 is a side view of portions of one embodiment of an aspirator system having two aspirators, in parallel, and one aspirator shut-off valve.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
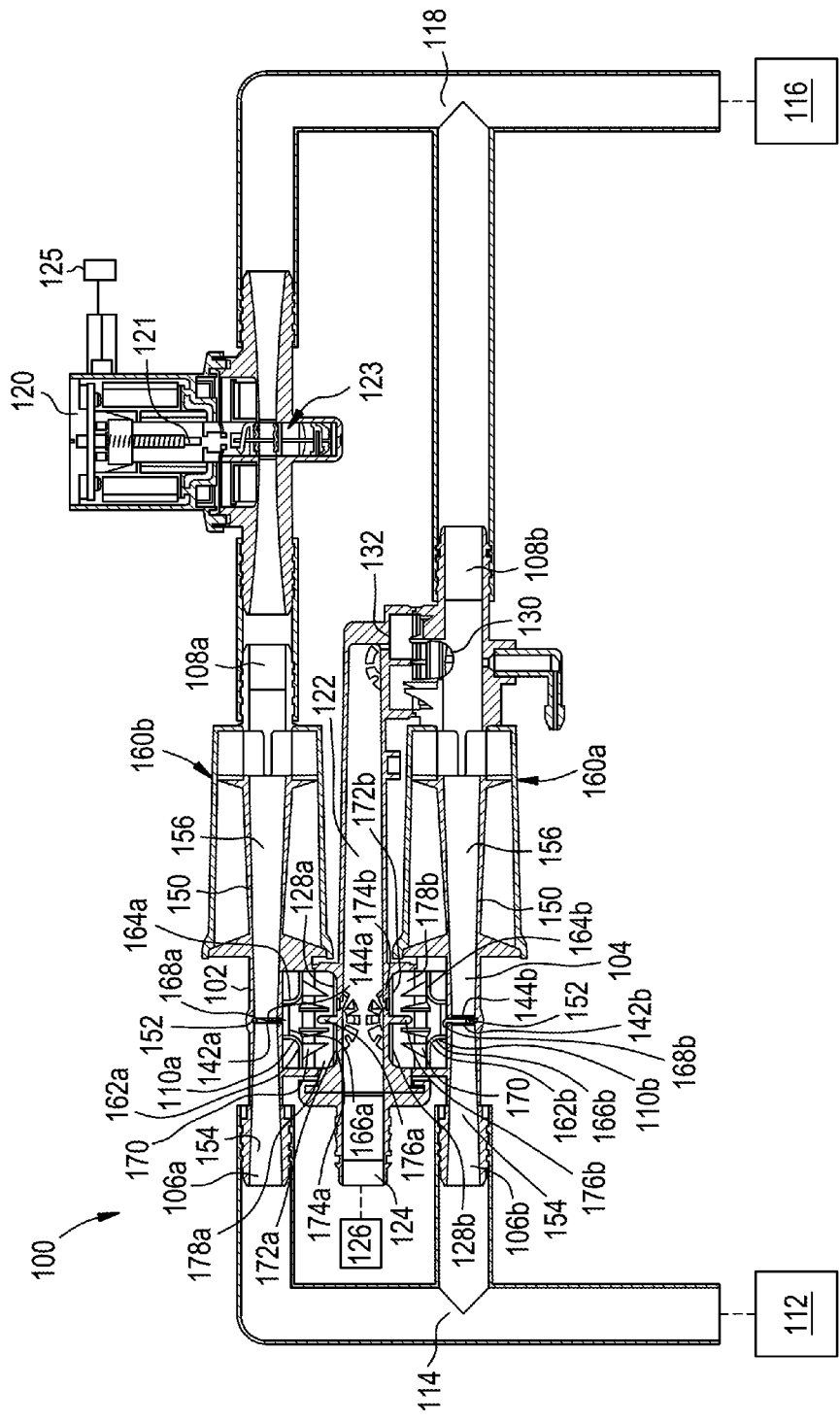
FIG. 2 is side, longitudinal cross-sectional, plan view of the system of FIG. 1.

FIGS. 1 and 2 illustrate an embodiment of a dual aspirator system 100. The dual aspirator system 100 is typically part of an internal combustion engine system, for example, a vehicle's engine. The system 100 includes a pair of aspirators 102, 104 in parallel, each with a motive port 106a, 106b, a discharge port 108a, 108b and a suction inlets 110a, 110b. In the depicted embodiment, the aspirators 102, 104 are "T-shaped" aspirators, but the principles generally disclosed herein may similarly be applied to "circular suction port"/"cone-in-cone" aspirators.

The motive ports 106a, 106b of both aspirators 102, 104 are in fluid communication with a high pressure source 112, for example the engine intake air cleaner or the compressor of a turbo charger of a vehicle. A multi-port junction 114 connects the motive ports 106a, 106b to the high pressure source 112. The discharge ports 108a, 108b of both aspirators 102, 104 are in fluid communication with a low pressure sink 116, for example an engine intake manifold downstream of the throttle of the vehicle engine, or the air cleaner box of a boosted engine. A multi-port junction 118 connects the discharge ports 108a, 108b to the low pressure sink 116.

Each aspirator 102, 104 defines a conduit 150 that includes a Venturi gap 152 separating the conduit 150 into a converging section 154 that begins at or proximate the respective motive port 106a, 106b and a diverging section 156 that ends at or proximate to the respective discharge port 108a, 108b. Both the converging sections 154 and the diverging sections 156 define continuously, gradually tapering inner passageways that narrow as they approach their Venturi gap 152 and create a Venturi effect on the fluid as it flows through the aspirator. The motive outlets 142a, 142b and the discharge inlets 144a, 144b of the aspirators 102, 104 may be sized and shaped to produce the desired flow capacity and Venturi effect therethrough, for example as discussed in U.S. patent application Ser. No. 14/294,727, filed Jun. 3, 2014, the entirety of which is incorporated by reference herein. The motive outlet 142a and/or discharge inlet 144a of the aspirator 102 may be the same or different size and shape as the motive outlet 142b and/or the discharge inlet 144b of aspirator 104 to provide different motive flow capacities for the respective aspirators 102, 104, and in turn to yield different potential combinations of motive flow rates through the system 100. In one embodiment, the Venturi gap 152 and the motive outlet 142a and the discharge inlet 144a of the first aspirator 102 are sized and shaped to provide the aspirator with an overall lower suction flow than the second aspirator, which is designed to provide a higher overall suction flow. In another embodiment, the opposite may be true, where the second aspirator 104 has an overall lower suction flow than the first aspirator 102.

The suction inlets 110a, 110b of the aspirators 102, 104 are conjoined by a suction housing 122, having a suction port 124. The conjoined nature of the construction reduces the number of components, thus reducing materials and cost, and compacts the construction for space savings within an engine. Accordingly, both suction inlets 110a, 110b are in fluid communication with the suction port 124, which connects both aspirators 102, 104 to the same device 126, such as a device requiring a vacuum or a vacuum reservoir. The device requiring a vacuum 126 may be a vehicle brake boost canister, a fuel vapor recovery canister, any number of pneumatic operated/controlled valves, or the like. By both aspirators 102, 104 being connected to the same device 126 quicker evacuation times are possible while reducing the motive flow required to complete the evacuation.

The aspirators 102, 104 may include check valves 128a, 128b positioned to prevent fluid from flowing from the suction inlets 110a, 110b toward the suction port 124. The check valves 128a, 128b may be positioned where the aspirators 102, 104 mate with the suction housing 122. In one embodiment, the aspirators 102, 104 include valve seats 162a, 162b. Each valve seat 162a, 162b is defined by a continuous outer wall 164a, 164b, and, optionally, a wall 166a, 166b. A bore 168a, 168b is defined in each valve seat 162a, 162b to allow for air flow communication with the Venturi gap 152. Each valve seat 162a, 162b may include a plurality of radially spaced fingers 170 extending from a surface thereof. The radially spaced fingers 170 serve to support a seal member 172a, 172b.

The suction housing 122 includes valve seats 174a, 174b defined by continuous outer walls of the suction housing 122 in a manner similar to that described above with respect to valve seats 162a, 162b. Valve seats 174a, 174b may each include a pin 176a, 176b extending toward the associated aspirator 102, 104. The pins 176a, 176b function as a guide for translation of the sealing members 172a, 172b within the cavities 178a, 178b defined by the mated valve seats 162a and 174a and defined by the mated valve seats 162b and 174b. Accordingly, each sealing member 172a, 172b includes a bore therethrough sized and positioned therein for receipt of the pin 176a, 176b within its respective cavity 178a, 178b.

One or both of the aspirators 102, 104 may further include a bypass port 130 (in the depicted embodiment, only aspirator 104), which may include a check valve 132. Also, one or more of the aspirators 102, 104 may include a sound attenuation unit. In FIGS. 1 and 2, the first aspirator 102 includes a sound attenuating unit 160a and the second aspirator 104 includes a sound attenuating unit 160b. The sound attenuating units 160a, 160b are illustrated to have a construction generally similar to at least one embodiment described in U.S. Provisional Patent Application No. 61/913,756, filed Dec. 9, 2013, the entirety of which is incorporated by reference herein, and may have a construction similar to other applicable embodiments therefrom.

An aspirator shut-off valve ("ASOV") 120 is disposed between the discharge port 108a and the multi-port junction 118 of the aspirator 102 in FIGS. 1 and 2. The ASOV 120 may be a gate valve with a piston 121 controlling the movement of a gate mechanism 123 that is translatable between an open position and a closed position. The ASOV may be pneumatically actuated. In FIG. 2, the ASOV 120 has its gate mechanism in a closed position where it blocks the flow of fluid between the discharge port 108a of the aspirator 102 and the low pressure sink 116. The ASOV 120 may be operatively connected to a computer or controller 125 in the vehicle to automatically control whether the ASOV 120 is in the open position or the closed position based on specific, pre-programmed system parameters. Alternatively, the ASOV 120 may be operatively connected to a gauge on the suction port 124 or another component or controller integrated into the system 100 or the vehicle to establish parameters to automatically and dynamically control the transition of the ASOV 120 between the open position and the closed position based on, for example, the suction pressure measured at the suction port 124. In one embodiment, the ASOV 120 may be of the type shown and described in U.S. patent application Ser. No. 14/154,268, filed Jan. 14, 2014, the entirety of which is incorporated by reference herein.

Figure 3:
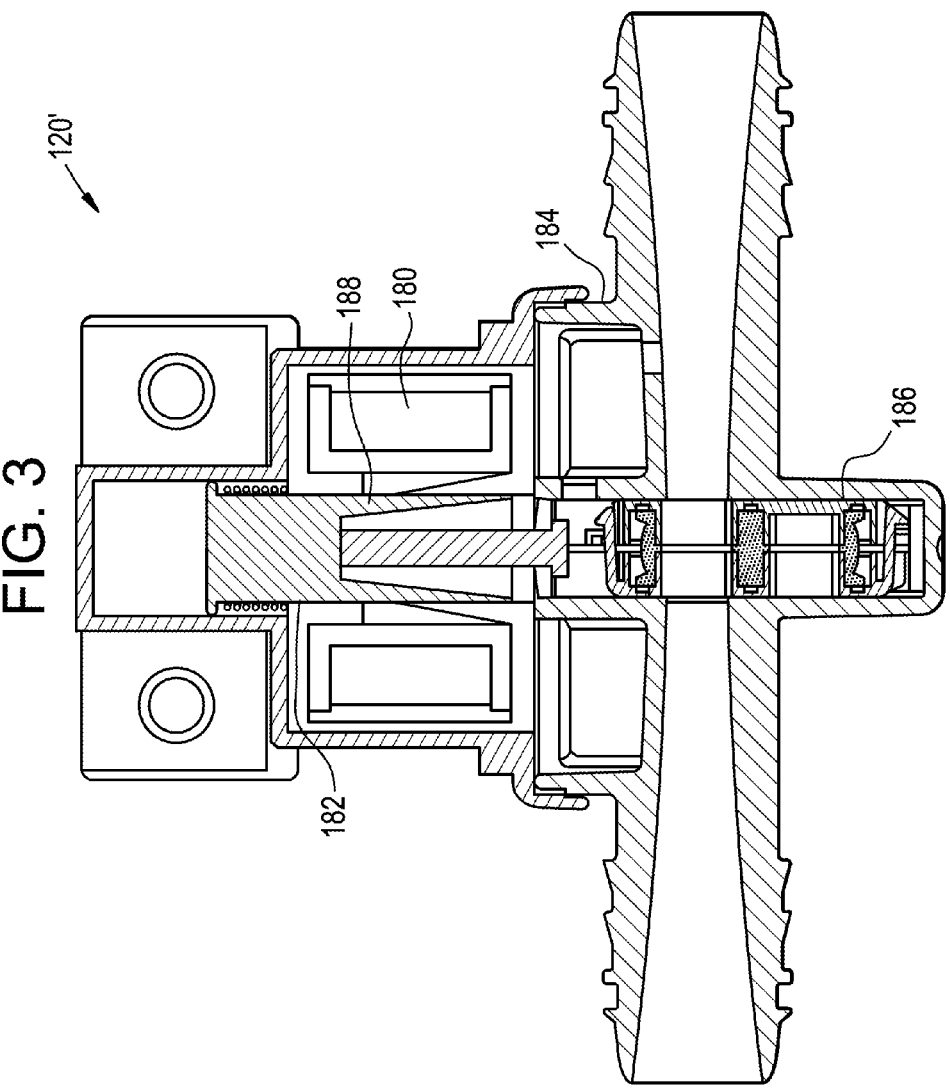
FIG. 3 is side, longitudinal cross-sectional, plan view of an embodiment of an aspirator shut-off valve.

In another embodiment, with reference to FIG. 3, the ASOV may be an electromagnetically actuated ASOV 120', for example of the type shown and described in U.S. Prov. Pat. App. No. 61/872,402, the entirety of which is incorporated by reference herein. The ASOV 120' may incorporate a solenoid coil 180 and an armature 182 connectable to a valve mechanism 184 to form a sprung gate assembly 186 linearly movable to open and/or close the ASOV through the application of electric current.

The ASOV may further alternately be an electromagnetically activated ASOV as shown and described in U.S. Prov. Pat. App. No. 61/914,658, filed on Dec. 11, 2013, the entirety of which is incorporated by reference herein. Alternately, the ASOV 120 may take any of a variety of other forms that enable the ASOV to selectively allow and/or block the flow of fluid through the system 100 as earlier described.

Accordingly, as shown in FIG. 1, a first flowpath 134 is defined between the high pressure source 112 and the low pressure sink 116 via the aspirator 104, and a second flowpath 136 is defined between the high pressure source 112 and the low pressure sink 116 via the aspirator 102 and controlled by the ASOV 120. When the ASOV 120 is in the closed position, flowpath 136 is blocked and the aspirator 102 does not contribute to the suction through the suction port 124. In an alternate embodiment, the ASOV 120 may instead be positioned along the flowpath 136 before the aspirator 102, between the high pressure source 112 and the inlet of the motive port 106a (but downstream of the multi-port junction 114) with the same effect. While the system 100 disclosed herein is described with respect to the first and second flowpaths 134, 136, the system is not limited thereto and may incorporate additional aspirators and/or ASOVs, in series or in parallel. It is possible to include the first and second aspirators 102,104 as described herein in any flowpath between other components of an engine system to generate and/or control vacuum generation and use.

In operation, under certain engine operating conditions, the aspirators 102, 104 may be controlled to generate vacuum quickly and/or to generate a variable depth of vacuum, based on whether the ASOV 120 is in the open position or in the closed position. When the ASOV 120 is the open position, both flowpaths 134, 136 are active to harness the motive flow through both aspirators 102, 104 and both contribute to the creation of suction through the suction port 124 for the device requiring a vacuum 126. The motive flow from the high pressure source 112 to the low pressure sink 116 travels freely through both flowpaths 134, 136, as facilitated by the multi-port junctions 114, 118 which permit the initial bifurcation and subsequent recombination of the motive flow through the system 100. Consequently, the Venturi effect created in the aspirators 102, 104 create suction flow 138 (shown in FIG. 1 as an arrow) along flowpath 134, and suction flow 140 (shown in FIG. 1 as an arrow) along flowpath 136, which together account for the total suction through the suction port 124.

In contrast, when the ASOV 120 is in the closed position, only flowpath 134, and not flowpath 136, is active to create suction through the suction port 124. Because the ASOV 120, in the closed position, prevents fluid communication between the high pressure source 112 and the low pressure sink 116 across flowpath 136, there is no significant pressure differential to draw fluid flow along flowpath 136. Absent the driving force of a pressure differential across flowpath 136, no Venturi effect is established in the aspirator 102 to create the suction necessary to open the check valve 128a and ultimately contribute to the suction through the suction port 124. Thus, when the ASOV 120 is in the closed position, only aspirator 104, and not aspirator 102, functions to create suction through the suction port 124. Further, because ASOV 120 does not affect flow through flowpath 134, the ASOV cannot interfere with the suction pressure generated by flowpath 134.

In accordance with the principles disclosed and described herein, the aspirator system 100 may be used to form a simple, inexpensive variable flow rate control device for a vehicle engine by controlling the physical flow characteristics of the aspirators 102, 104 and by setting the operational parameters for opening and closing the ASOV 120. The conditions for automatically opening and closing the ASOV may be pre-programmed according to the desired motive mass flow rate through the system and/or the desired level of suction creation, thereby allowing the system to dynamically respond and adjust the motive mass flow rate as appropriate given the needs of the system 100. Moreover, the system 100 enables variation in the motive mass flow rate while suction pressure is being continually generated by at least one of the plurality of aspirators.

Having described the invention in detail and by reference to preferred embodiments thereof, it will be apparent that modifications and variations are possible without departing from the scope of the invention which is defined in the appended claims.

What is claimed is:

1. An engine system comprising:
a first flowpath between a first component and a second component in an engine system, wherein a first aspirator forms a portion of the first flowpath;
a second flowpath between the first component and the second component, wherein a second aspirator forms a portion of the second flowpath, and wherein a shut-off valve forms a portion of the second flowpath to shut off the flow therethrough without shutting off a flow through the first aspirator;
wherein the first aspirator defines a conduit having a Venturi gap separating the conduit into a converging section and a diverging section and the second aspirator defines a conduit having a Venturi gap separating the conduit into a converging section and a diverging section;
wherein a suction housing having a suction port and conjoinly mating the Venturi gaps of the first and second aspirators for each have a suction inlet, and wherein the suction inlet of the first aspirator is in fluid communication of both Venturi gaps with the suction inlet of the second aspirator and both suction inlets are in fluid communication with a suction port to draw a total combined suction through the suction port.

2. The engine system of claim 1, wherein the first aspirator has a first motive outlet, wherein the second aspirator has a second motive outlet, and wherein a size and/or a shape of the first motive outlet is different from a size and/or a shape of the second motive outlet.

3. The engine system of claim 2, wherein the first motive outlet is larger than the second motive outlet.

4. The engine system of claim 2, wherein the second motive outlet is larger than the first motive outlet.

5. The engine system of claim 1, wherein the shut-off valve is pneumatically-actuated.

6. The engine system of claim 1, wherein the shut-off valve is electromagnetically-actuated.

7. The engine system of claim 1, further comprising a check valve disposed between the suction port and the suction inlet of at least one of the first and second aspirators.

8. The engine system of claim 1, further comprising check valves disposed between the suction port and the suction inlets of both the first aspirator and the second aspirator.

9. The engine system of claim 1, wherein at least one of the first aspirator and the second aspirator further comprises a bypass port.

10. The engine system of claim 1, wherein the shut-off valve is positioned within the second flow path downstream from the second aspirator.

11. A system for generating vacuum comprising:
a first aspirator defining a conduit having a Venturi gap separating the conduit into a converging section and a diverging section;
a second aspirator defining a conduit having a Venturi gap separating the conduit into a converging section and a diverging section;
a suction housing having a suction port and conjoiningly mating the Venturi gap of the first aspirator with the Venturi gap of the second aspirator for fluid communication of both Venturi gaps with the suction port to draw a total combined suction through the suction port;
a shut-off valve positioned in a flowpath of the second aspirator to shut off the flow therethrough without shutting off a flow through the first aspirator;
wherein the suction port connects both the first aspirator and the second aspirator to the same device requiring a vacuum or a vacuum reservoir.

12. The system of claim 11, further comprising a first check valve positioned between the Venturi gap of the first aspirator and the suction housing and a second check valve positioned between the Venturi gap of the second aspirator and the suction housing.

13. The system of claim 11, wherein the shut-off valve is pneumatically-actuated.

14. The system of claim 11, wherein the shut-off valve is electromagnetically-actuated.

15. The system of claim 11, wherein the converging section of the first aspirator has a first motive outlet, wherein the converging section of the second aspirator has a second motive outlet, and wherein a size of the first motive outlet is different from a size of the second motive outlet.

16. The system of claim 15, wherein the first motive outlet is larger than the second motive outlet.

17. The system of claim 15, wherein the second motive outlet is larger than the first motive outlet.

18. The system of claim 11, wherein the shut-off valve is positioned in the flowpath downstream of the second aspirator.

19. The system of claim 11, wherein the first aspirator further comprises a bypass port in fluid communication with the suction housing.

* * * * *